US005365648A

United States Patent [19]

Fuga

[11] Patent Number: 5,365,648

[45] Date of Patent: Nov. 22, 1994

[54] SLIDE HAMMER HAVING REMOVABLE TIP

[76] Inventor: Peter M. Fuga, 9273 Wild Oaks Cir., South Lyon, Mich. 48178

[21] Appl. No.: 215,061

[22] Filed: Mar. 18, 1994

[51] Int. Cl.[5] .............................................. B23P 19/04

[52] U.S. Cl. ...................................................... 29/254

[58] Field of Search ...................... 173/90, 91; 81/438, 81/439; 29/254, 255, 264, 275, 283; 403/326

[56] References Cited

U.S. PATENT DOCUMENTS

| | | | |
|---|---|---|---|
| 3,239,233 | 3/1966 | Stillwagen | 81/438 |
| 3,945,104 | 3/1976 | Brookover | 29/255 |
| 3,964,368 | 6/1976 | Safie . | |
| 4,021,955 | 5/1977 | Curtis . | |
| 4,536,981 | 8/1985 | Giragosian . | |
| 4,720,904 | 1/1988 | Palla, Jr. . | |
| 5,062,486 | 11/1991 | McClenahan . | |
| 5,088,174 | 2/1992 | Hull et al. . | |
| 5,099,562 | 3/1992 | Laughran . | |
| 5,197,878 | 3/1993 | Lukase et al. . | |
| 5,245,737 | 9/1993 | Perea . | |

*Primary Examiner*—Robert C. Watson
*Attorney, Agent, or Firm*—Dykema Gossett

[57] ABSTRACT

A pull slide hammer for the removal of dowel pins includes a removable tip which may be exchanged with another tip. The entire locking structure is internally within a shaft of the slide hammer. The removable tip is threadably received within a cylindrical cavity of the shaft. A locking member and a bias member are interposed between the tip and an end wall of the cavity. The locking member includes an extension having a hexagonal cross section corresponding approximately to a locking bore in the removable tip. The locking member is urged towards the removable tip and selectively prevents rotation of the removable tip relative to the shaft. The tip is easily removed from the shaft upon removal of the extension from the locking bore in order to exchange the tip with another tip.

14 Claims, 1 Drawing Sheet

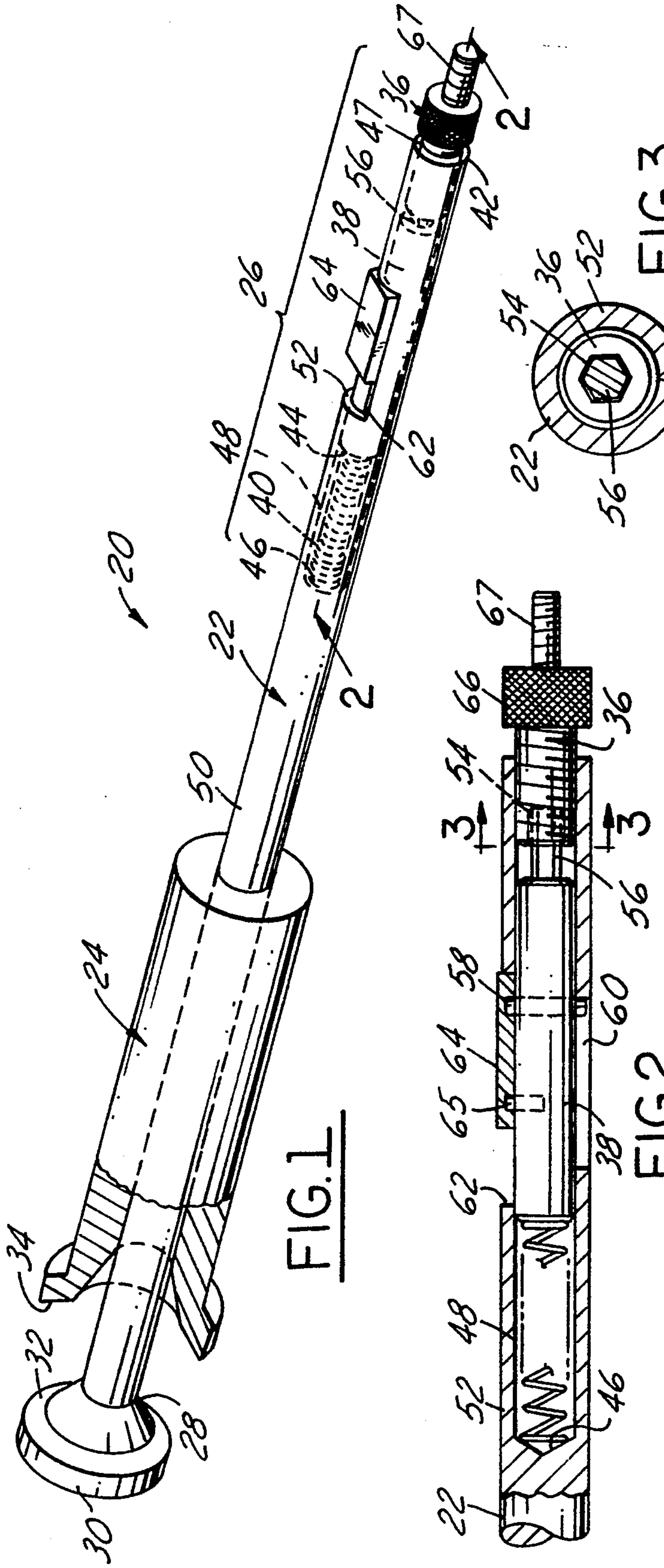
FIG. 1
FIG. 2
FIG. 3
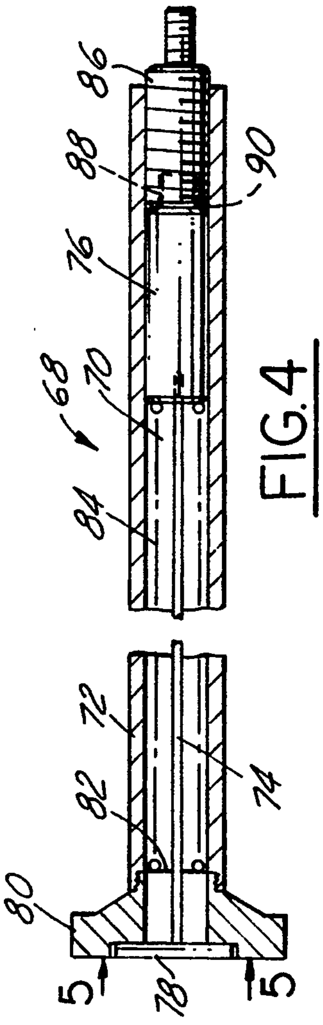
FIG. 4
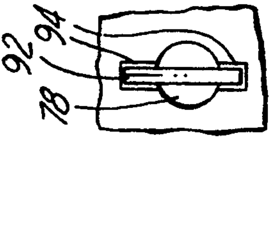
FIG. 5
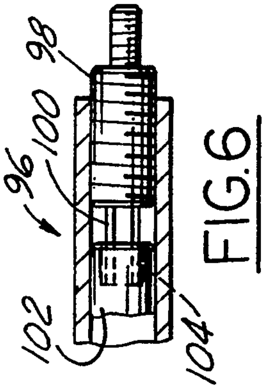
FIG. 6

SLIDE HAMMER HAVING REMOVABLE TIP

BACKGROUND OF THE INVENTION

This invention relates generally to a slide hammer, and more particularly, to a pull slide hammer having a removable tip which may be selectively locked into the slide hammer.

Pull slide hammers are used for a variety of purposes, such as pulling an item from a structure, or removing a dowel pin. Some slide hammers include a hook that latches onto the item for removal by a pulling force. When removing a dowel pin, the slide hammer typically includes a threaded tip, which is received in a threaded bore of the dowel pin. The dowel pin may then be pulled by the slide hammer for removal.

Due to the variety of uses of the pull slide hammer, it is desirable for the tip to be exchangeable with another tip. When a removing a dowel pin, for example, the tip of the slide hammer must conform with threaded bore which may have a variety of dimensions depending on the dowel pin. It is also desirable to sometimes replace the tip.

It is known in the art to provide a pull slide hammer with a removable tip, which may be exchanged for another tip. Due to the pulling force, however, the tip must be rigidly secured to the slide hammer. In a manufacturing environment, the tip of the pull slide hammer is semi-permanently attached to the slide hammer. Although the tip be removed, it cannot be removed easily or quickly.

It is known in the art to provide a pull slide which includes a locking pin that extends laterally relative to the shaft for selectively locking the tip. The locking pin is inserted through aligned apertures in the shaft and in the tip. The pin extends laterally beyond the dimensions of the shaft. The opposing ends of the locking pin each include a structure preventing removal. It is undesirable, however, to have any structure beyond the lateral dimensions of the shaft, particularly if the slide hammer must extend through narrow passageways. In addition, any structure beyond on an outside surface of the slide hammer shaft is likely to catch on various items in the environment of the dowel pins.

Therefore, an aspect of this invention is to provide a pull slide hammer having an exchangeable tip that may be easily locked into a position.

It is a further aspect of the invention to provide a pull slide hammer having a removable tip, wherein the entire locking structure for the tip is in an internal cavity of the pull slide hammer shaft.

It is a further aspect of the invention to provide a slide hammer having a removable tip which may be released from a distal end of the slide hammer.

SUMMARY OF THE INVENTION

In accordance with the present invention, a pull slide hammer having an improved locking assembly for a removable tip is provided. The locking assembly allows one tip to be exchanged with another tip. In a disclosed embodiment, the locking assembly is received within a cylindrical cavity extending along a longitudinal dimension of the shaft. The locking assembly includes a removable tip, a locking member, and a biasing member. The removable tip is threadably received within one end of the cavity. The locking member and the biasing member are interposed between the removable tip and the other end of the cavity. The locking member selectively prevents rotation of the removable tip, and the biasing member urges the locking member towards the removable tip. To achieve this, the removable tip includes a locking bore, and the locking member includes an extension. The extension of the locking member has a hexagonal cross-section corresponding to a cross section of the locking bore. The locking member is coupled to the shaft for sliding movement, but is further coupled to the shaft to prevented rotation of the locking member relative to the shaft. When the extension is selectively inserted into the locking bore, the removable tip cannot rotating along the threads, and is thereby in a fixed position relative to the shaft of the slide hammer.

BRIEF DESCRIPTION OF THE DRAWINGS

Various features of the present invention will become more apparent upon reading the following detailed description of the preferred embodiments, along with the appended claims in conjunction with the accompanying drawings, wherein identical reference numerals identify like features, and:

FIG. 1 is a perspective view of an inventive slide hammer;

FIG. 2 is a partial cross-sectional view along lines 2—2 of FIG. 1;

FIG. 3 is a cross-sectional view along lines 3—3 of FIG. 2;

FIG. 4 is a cross-sectional view of a second embodiment of an inventive slide hammer corresponding approximately to the view of FIG. 2;

FIG. 5 is a partial rear view of the inventive slide hammer along lines 5—5 of FIG. 4; and FIG. 6 is a partial cross-sectional view of an alternate embodiment of a locking assembly for the slide hammer.

DETAILED DESCRIPTION OF THE PREFERRED EMBODIMENT

Referring now to FIG. 1, an inventive slide hammer 20 includes a shaft 22, a hammer member 24, and a tip assembly 26. Slide hammer 20 is used to remove items, such as a dowel pin, by imparting a pulling force generally towards the operator.

Shaft 22 of slide hammer 20 extends along a longitudinal axis, and has a generally circular cross-section. A rearward end 28 of shaft 22 includes an impact member 30 which extends radially outwardly from the shaft. Impact member 30 has a cross-section greater than the cross-section of shaft 22, and includes a pounding surface 32. Hammer member 24 extends about shaft 22 for longitudinal movement along the shaft. Hammer member 24 is weighted, and includes a pounding surface 34, corresponding to pounding surface 32. Hammer member 24 and impact member 30 operate as a conventional slide hammer to impart a pounding force on the pounding surfaces 32 and 34. The pounding force pulls shaft 22 toward rearward end 28.

Referring to FIGS. 1 and 2, tip assembly 26 of slide hammer 20 includes a removable tip 36, a locking member 38 and a biasing member 40. Tip assembly 26 is positioned in proximity to a forward end 42 of slide hammer 20. Due to the pulling force on removable tip 36 when operating slide hammer 20, removable tip 36 must be rigidly secured to the slide hammer. Otherwise, removable tip 36 will pull out during operation.

Shaft 22 includes a cylindrical cavity 44 extending longitudinally from forward end 42. Cavity 44 includes an end wall 46 at the rearward most portion of the cavity, an opening 47 at the other end, and an internal surface 48 extending along the longitudinal dimension. An external surface 50 of shaft 22 opposes internal surface 48.

As shown in FIG. 3, the cross-section of shaft 22 along cavity 44 is generally circular having an internal diameter corresponding to internal surface 44, and an outer diameter corresponding to external surface 50. A sidewall 52 of shaft 22 is defined between internal surface 48 and external surface 50.

The forward most portion of cavity 44 is threaded. Removable tip 36 is threadably received at the forward most portion of cavity 44, and extends longitudinally beyond shaft 22.

Removable tip 36 further includes a locking bore 54 having a hexagonal cross-section. Locking member 38 includes an extension 56 that cooperates with locking bore 54 to selectively prevent rotation of removable tip 36. In this manner, the removable tip cannot rotating along the threads, and is thereby in a fixed position relative to shaft 22 of the slide hammer.

To achieve the this, locking member 38 is received within cavity 44 interposed between removable tip 36 and end wall 46 of the cavity. Locking member 38 is movable longitudinally along cavity 44, but is otherwise prevented from rotating relative to shaft 22. A key member 58 extends laterally through locking member 38. A key way 60 extends longitudinally in sidewall 52 of shaft 22 along internal surface 48. Key member 56 travels along key way 58 preventing rotation of locking member 38 relative to shaft 22.

Extension 56 extends longitudinally from locking member 38 towards removable tip 36. Extension 56 has a hexagonal cross-section corresponding approximately to the cross-section of locking bore 54, but having slightly smaller dimensions. Extension 56 is thereby adapted to be received in locking bore 54 of removable tip 36. The cross-sections of locking bore 54 and extension 56 may be any combination of shapes whereby removable tip 36 and locking member 38 cannot rotate relative to each other when extension 56 is inserted into locking bore 54. For example, both may have any non-circular cross-section, such as square, oval, triangular or rectangle. The cross-sections do not necessarily have to be the same relative shape, as long as removable tip 36 may not rotate relative to locking member 38.

Biasing member 40, shown as a coil spring, is received in cavity 44 interposed between locking member 38 and end wall 46 of cavity 44. Biasing member 40 urges locking member 38 toward removable tip 36. End wall 46 is angled relative to lateral plane, and converges from internal surface 48 of cavity 44 to a center point. Biasing member 40 is seated on an angled portion of end wall 46.

In order to selectively remove extension 56 from locking bore 54, an opening 62 extends through sidewall 52 of shaft 22. Opening 62 corresponds approximately to the relative position of locking member 38 within cavity 44. A thumb pad 64 is rigidly secured to locking member 38, and extends through opening 62. Key member 56 and an attachment device 65 extend into thumb pad 64 to attach thumb pad 64 to locking member 38. The circumferential dimension of thumb pad 64 corresponds approximately to the circumferential dimension of opening 62. Thumb pad 64, in combination with key member 56 and key way 58, further prevents rotation of locking member 38 relative to shaft 22.

In FIG. 3, a cross-section of extension 56 and locking bore 54 is shown. Because removable tip 36 is threaded to internal surface 48, and locking member is fixed from rotating relative to shaft 22, removable tip 36 cannot be removed in the position shown. In order for removable tip 36 to be rotated for detachment from shaft 22, extension 56 must be released from locking bore 54. Biasing member 40 maintains removable tip in a locked position during normal operation.

In order to remove removable tip 36, locking member 38 is moved rearwardly by rearward movement of thumb pad 64. Removable tip 36 may then be rotated for detachment from shaft 22. A second removable tip, which replaces removable tip 36, may then be threaded into cavity 44. Thumb pad 64 is released, so that locking member 44 is urged towards the second removable tip. The second removable tip may have to be adjusted slightly by rotation so that extension 56 of locking member 38 is received within locking bore 54. The removable tip is then locked in a precise position until extension 56 is released from locking bore 54. In this manner, a variety of types of removable tips may be easily removed and exchanged with another tip.

Removable tip 36 includes a gripping ring 66 to assist in rotating removable tip 36 during insertion and detachment from shaft 22. A projection 67 of removable tip 36 is threaded to cooperate with the dowel pin being pulled. In most applications, projection 67 is threadably received within a corresponding threaded bore in the dowel pin. After being connected to projection 67, the dowel pin is forced rearwardly by blows of hammer member 24 against impact member 30 of shaft 22. Although a threaded projection is shown, any type of projection may be used, such as a hook, depending on the various applications of the pull slide hammer.

All components of tip assembly 26 are received in an internal portion of shaft 22, and specifically in cavity 44. No members of tip assembly 26 extend substantially beyond an outer circumferential surface of shaft 22. Therefore, no members of tip assembly 26 will snag on items in the environment where slide hammer 20 is being used. Further, tip assembly 26 allows for shaft 22 of slide hammer 20 to extend into narrow passageways having dimensions only slightly greater than the dimensions of shaft 22.

FIG. 4 illustrates an alternative embodiment of an inventive slide hammer 68. In this embodiment, a cylindrical cavity 70 extends substantially along the entire longitudinal length of a shaft 72. A release bar 74 extends along an approximate center of cavity 70, and is rigidly secured to a locking member 76. A handle 78 is secured to an opposite end of release bar 74. An impact member 80 is threadably received on shaft 72 and defines an end wall 82 of cavity 70. A biasing member 84 is interposed between locking member 76 and end wall 82 to urge locking member 76 towards a removable tip 86. Locking member 76 includes an extension 88 for insertion into a locking bore 90 of removable tip 86.

Referring now to FIG. 5, handle 78 includes a plurality of radial legs 92. Legs 92 are received in radial notches 94 formed in impact member 80. When legs 92 of handle 78 are received within notches 94, locking member 76 is prevented from rotating, and thus prevents rotation of removable tip 86, as described for the first embodiment. As an alternative, to prevent rotation of locking member 76 relative to shaft 72, a key member and key way combination could also be used as described for the first embodiment.

Handle 78, release bar 74 and locking member 76 are a rigid structure which rotate together. By pulling on handle 78 extension 88 of locking member 76 is released from locking bore 90 formed in removable tip 84. Removable tip 86 may then be detached from shaft 72.

The second embodiment allows an operator to unlock removable tip 86 from a distal end of slide hammer 68. Slide hammer 68 sometimes extends a substantial distance in order to access a dowel pin which must be removed.

FIG. 6 shows an alternative embodiment of a tip assembly 96. Essentially, the extension/locking bore combination is reversed for the locking member and removable tip. As shown, a removable tip 98 is modified to include an extension 100 which has a non-circular cross-section. A locking member 102 is modified to include a locking bore 104 corresponding to the dimensions of extension 100, such that extension 100 may be inserted into bore 104. Operation of the pull slide hammer is otherwise similar to the embodiments described.

Preferred embodiments of the present invention have been disclosed. A worker of ordinary skill in the art will recognize, however, that modifications of the disclosed embodiments will fall within the scope of this invention. For that reason, the following claims should be studied to determine the true scope and content of this invention.

What is claimed is:

1. A locking assembly comprising:

a longitudinally extending shaft, said shaft having a longitudinally extending cavity, said cavity having an end wall at one end, an opening at the other end, and an internal sidewall surface, said sidewall surface extending longitudinally, at least a portion of said side wall surface being threaded;

a tip threadably received within said cavity;

a locking member received within said cavity interposed between said end wall and said tip, said locking member being fixed rotationally with respect to said shaft;

one of said tip and said locking member having a non-circular bore extending longitudinally, and the other of said tip and said locking member having an extension adapted to be selectively received within said bore, said extension having a cross-section corresponding approximately to the cross-section of said bore, whereby said tip is prevented from rotating relative to said shaft to prevent removal of said tip from said shaft.

2. The locking assembly of claim 1, wherein said locking member is coupled to said shaft for longitudinal sliding movement.

3. The locking assembly of claim 1, wherein a biasing member is received within said cavity interposed between said end wall and said locking member, said biasing member urging said locking member towards said tip.

4. The locking assembly of claim 1, wherein said cross-section of said extension and said cross-section of said bore is a hexagon.

5. A slide hammer having a hammer end and a tip end, said slide hammer providing a pulling force in the direction of said hammer end, said slide hammer comprising:

a longitudinally extending shaft assembly extending substantially between said hammer end and said tip end, said shaft having a cross-section of a first dimension, said hammer end having a portion extending radially outwardly to define a cross-section of a second dimension, said second dimension being greater than said first dimension to define an impact surface, said shaft further including a longitudinally extending generally cylindrical cavity, said cavity including a threaded portion;

a hammer member received about said shaft assembly for sliding movement along said shaft assembly, said hammer member including an impact surface to correspond with said impact surface of said shaft assembly, said hammer member being adapted to impart a pulling force on said shaft assembly;

a tip having a corresponding threaded portion, said tip being threadably received within said cavity on said threaded portion, said tip further including a longitudinally extending locking bore, said locking bore having a non-circular cross-section;

a locking member received within said cavity interposed between an end wall of said cavity and said tip, said locking member including an extension having a cross-section corresponding approximately to the cross-section of said locking bore, said extension being adapted to be selectively received within said locking bore, said locking member being rotationally fixed to said shaft assembly, said extension being selectively inserted into said locking bore to prevent rotation of said tip, and thereby selectively prevent removal of said tip.

6. The slide hammer of claim 5, wherein said locking member includes a laterally extending key member, said key member being received within a longitudinally extending key way in a sidewall of said shaft assembly, said key member and said key way preventing rotation of said locking member relative to said shaft assembly.

7. The slide hammer of claim 5, wherein a biasing member is received within said bore interposed between said locking member and said end wall urging said locking member towards said tip.

8. The slide hammer of claim 5, wherein a sidewall of said shaft assembly includes an opening to correspond approximately with said locking member, said locking member including a thumb pad extending through said opening.

9. The slide hammer of claim 5 further comprising a release bar fixed to said locking member and extending longitudinally through said cavity and through an opening in said impact member, said release bar being rigidly secured to said locking member at one end and having a handle at the other end, such that longitudinal movement of said handle moves said locking member longitudinally.

10. A slide hammer having a hammer end and a tip end, said hammer providing a pulling force in the direction of said hammer end, said slide hammer comprising:

a longitudinally extending shaft assembly extending substantially between said hammer end and said tip end, said shaft having a cross-section of a first dimension, said hammer end having a portion extending radially outwardly to define a cross-section of a second dimension, said second dimension being greater than said first dimension to define an impact surface, said shaft further including a longitudinally extending generally cylindrical cavity, said cavity including a threaded portion;

a hammer member extending longitudinally and being received about said shaft assembly for sliding movement along said shaft assembly, said hammer member including an impact surface to correspond with said impact surface of said shaft assembly, said hammer member being adapted to impart a pulling force on said shaft assembly;

a tip having a corresponding threaded portion, said tip being threadably received within said cavity on said threaded portion, said tip further including a longitudinally extending extension, said extension having a non-circular cross-section;

a locking member received within said cavity interposed between an end wall of said cavity and said tip, said locking member including a locking bore having a cross-section corresponding approximately to the cross-section of said extension, said extension of said tip being adapted to be selectively received within said locking bore, said locking member being rotationally fixed to said shaft assembly, said extension being selectively inserted into said locking bore to prevent rotation of said tip, and thereby selectively prevent removal of said tip.

11. The slide hammer of claim 10, wherein said locking member includes a laterally extending key member, said key member being received within a longitudinally extending key way in a sidewall of said shaft assembly, said key member and said key way preventing rotation of said locking member relative to said shaft assembly.

12. The slide hammer of claim 10, wherein a biasing member is received within said bore interposed between said locking member and said end wall urging said locking member towards said tip.

13. The slide hammer of claim 10, wherein a sidewall of said shaft assembly includes an opening to correspond approximately with said locking member, said locking member including a thumb pad extending through said opening.

14. The slide hammer of claim 10 further comprising a release bar fixed to said locking member and extending longitudinally through said cavity and through an opening in said impact member, said release bar being rigidly secured to said locking member at one end and having a handle at the other end, such that longitudinal movement of said handle moves said locking member longitudinally.

* * * * *